April 27, 1965 H. L. BAKKER 3,181,033

OVERVOLTAGE PROTECTION CIRCUIT

Filed Nov. 15, 1961

INVENTOR
H. L. BAKKER
BY
AGENT

United States Patent Office 3,181,033

Patented Apr. 27, 1965

3,181,033

OVERVOLTAGE PROTECTION CIRCUIT

Harm Louwrinus Bakker, Hilversum, Netherlands, assignor to North American Philips Company, Inc., New York, N.Y., a corporation of Delaware Filed Nov. 15, 1961, Ser. No. 152,450
Claims priority, application Netherlands, Nov. 17, 1960, 258,073
4 Claims. (Cl. 317—61)

Figure 1:
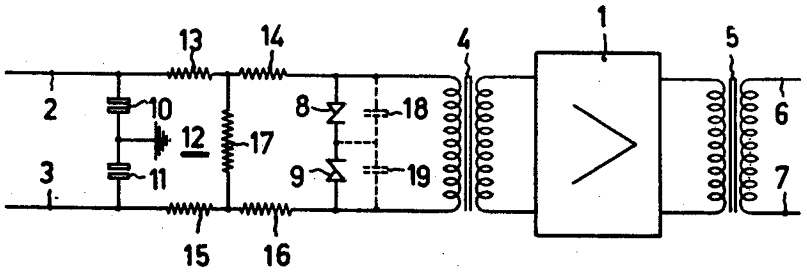

The invention relates to an overvoltage protection circuit for use in a transmission apparatus, in order to protect the apparatus from high peak voltages. The circuit comprises two Zener diodes operating as voltage limiters and connected in relatively opposite pass directions, and is particularly adapted for use in carrier frequency telephone systems.

Such overvoltage protection circuits serve to reduce high incoming voltage peaks to a safe value for the apparatus. The high voltage peaks may, for example, be due to strokes of lightning, inductance pulses from electric mains or traction mains and the like. The safe value is of the order to a few volts in a transmission apparatus. If desired, the overvoltage protection circuit may be preceded by the known carbon block protector or gas cartridge protector in order to reduce excessively high incoming voltage peaks to lower values, for example of a few hundreds or tens of volts.

The device of the kind set forth provides an effective protection of the apparatus, but it has been found that, when using high carrier wave frequencies, for example of 100 kc./s. and more and, as the case may be, wide frequency bands, as is the case with carrier wave telephone systems having a large number of channels, the transmission quality of the carrier wave telephone signals is affected adversely.

The invention has for its object to provide a device of the kind set forth in which not only an effective protection of the apparatus but also a substantial reduction of the adverse influence on the transmission quality of the transmitted signal are obtained.

The device according to the invention is characterized in that the Zener diodes are included in two parallel connected branches. In each branch a conventional diode is connected to series with the respective Zener diode. The pass direction of the conventional diode corresponds with the Zener pass direction of the series-connected Zener diode. In each of the parallel-connected branches the junction of the Zener diode and the series connected conventional diode is connected by way of a series resistor to a bias voltage source. The bias source supplies a blocking voltage for the conventional diode.

Figure 2:
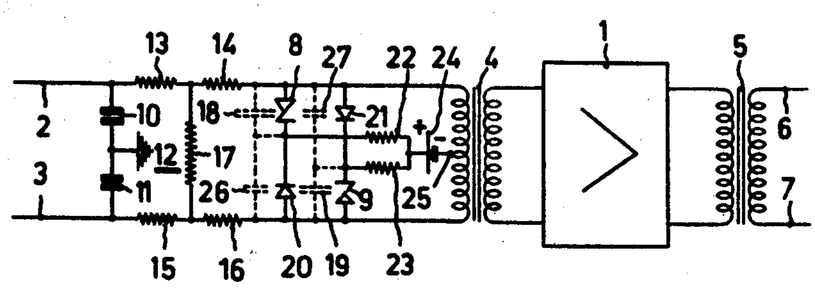

The invention and its advantages will now be described more fully with reference to the drawing, in which:

FIG. 1 shows a carrier-wave telephone line repeater with a known overvoltage protection circuit; and FIG. 2 shows an overvoltage protection circuit according to the invention.

FIG. 1 shows in a block diagram a line repeater 1 of a carrier wave telephone system with transistor equipment, suitable for the transmission of carrier wave telephone signals in the band from 12 to 552 kc./s. The carrier wave telephone signals are supplied by way of incoming lines 2, 3 and an input transformer 4 to the line repeater 1 in transistor equipment. The repeater is connected to output lines 6, 7 by way of an output transformer 5.

In order to protect the repeater from high peak voltages, which may reach the repeater 1 by way of the lines 2, 3, an overvoltage protection circuit comprising two series-connected Zener diodes 8, 9 is connected between the lines 2, 3. The pass directions of the Zener diodes are opposite. The diodes 8, 9 are preceded by a carbon block protector formed by two series-connected carbon blocks 10, 11, the junction of the blocks 10, 11 being connected to ground. Between the carbon block protector 10, 11 and the Zener diodes 8, 9 provision is made of a resistance attenuator 12, formed by series resistors 13, 14, 15, 16 and a transverse resistor 17. The attenuator limits the Zener diode current when the Zener diodes 8, 9 break down. The resistance attenuator 12, which may have, for example, a damping factor of 1 db, matches the line impedance and therefore does not disturb the line impedance.

When in the device so far described the line repeater 1 receives carrier wave telephone signals from incoming lines 2, 3 having a maximum level of 3 v. i.e., a value lying below the break-down voltage of the carbon block protector 10, 11 of 500 v. and the Zener voltage of 9 v., the carbon block protector 10, 11 and the Zener diodes 8, 9 constitute a very high impedance. In this case, the carrier wave telephone signals reach the line repeater 1 without attenuation in the carbon block protector 10, 11 and the Zener diodes 8, 9; and the repeater transmits the carrier wave telephone signals, subsequent to amplification, to the pair of output lines 6, 7 for further operation.

The overvoltage protection circuit operates quite differently for incoming high voltage peaks. If, for example, a high voltage peak, which may tbe initially limited in the carbon block protector 10, 11, is applied to the series-connected Zener diodes 8, 9 with a voltage amplitude exceeding the Zener voltage, the series-connected Zener diodes 8, 9 will pass current in the Zener direction, so that the high voltage peak is limited to the Zener voltage. Both positive and negative voltage peaks are thus reduced to the amplitude of the Zener voltage of 9 v., which can be safely worked by the transistorized line repeater 1.

The known overvoltage protection circuit described above provides an effective protection of the apparatus, but it has been found that the transmission quality of the transmitted telephone signals, particularly at the higher carrier wave frequencies, is adversely affected. This disadvantage appears to be due to the Zener diode capacities 18, 19 (indicated in broken lines in the figure), which vary substantially as a function the instantaneous amplitude of the carrier wave telephone signals. For example, the capacitances may vary between 200 and 600 $\mu\mu$f. These Zener diode capacities 18, 19 varying with the signal amplitude introduce non-linear distortions into the transmitted signals, for example harmonics, intermodulation products and the like, which increase with the carrier wave frequency. With a measuring signal of 387 mv. (1 mv./150 ohm) and a frequency of 180 kc./s. with a selected pair of Zener diodes of satisfactory quality, a second harmonic (360 kc./s.) and a third harmonic (540 kc./s.) with intensities of −68 db and −84 db respectively were measured. These intensities of the distortion products exceed the requirements with respect to distortion for the line repeater 1.

Apart from effective protection of the apparatus the circuit according to the invention, shown in FIG. 2, provides a substantial reduction of the signal distortions as compared with the circuit of FIG. 1.

To this end the Zener diodes 8, 9 of the circuit according to the invention shown in FIG. 2 are connected with opposite polarities in two parallel branches. Conventional diodes 20 and 21 are connected in series with the Zener diodes 8 and 9, respectively, with like electrodes being connected together so that the pass direction of each conventional diode is the same as the Zener pass direction of the respective Zener diode. In each of the parallel connected branches the junctions of the Zener diodes 8, 9 and of the series-connected conventional diodes 20, 21 respectively are connected by way of series resistors 22, 23 respectively to a bias voltage source 24. The source 24 supplies a blocking voltage for the conventional diodes 20, 21. The blocking voltage is adjusted so that with signal transmission of a maximum signal voltage of, for example, 3 v. both the diodes 20, 21 and the Zener diodes 8, 9 are blocked; it has been found, in particular, to be advantageous to choose a blocking voltage approximately equal to half the Zener voltage of 9 v.; in the embodiment shown it is 5 v.

As in the device shown in FIG. 1, a voltage peak exceeding the Zener voltage occurring in the overvoltage protection circuit shown is limited to the safe value of the Zener voltage, in this case 9 v. If, for example, a positive voltage peak having an amplitude exceeding the Zener voltage is applied between lines 2, 3, the branch 21, 9 will pass current, since the total voltage required for passing current through the branch 21, 9 is equal to the sum of the partial voltages required to render the diode 21 and the series-connected Zener diode 9 conductive. In other words, the blocking voltage on diode 21 is the voltage of source 24, which is 5 volts in the above example. In order to render the diode 21 conductive it is thus necessary to apply a forward voltage of at least 5 volts to the diode 21. Similarly, the reverse bias on the Zener diode 9 is the same as the voltage of source 24, i.e., 5 volts. In order for the Zener diode to conduct in the Zener pass direction, it is thus necessary to increase this reverse bias to the Zener voltage of 9 volts, so that an increase of reverse bias of 4 volts is required for conduction. The voltage required to cause current flow in the series branch 21, 9 is thus the sum of the voltage of the source 24 (which is blocking the diode 21) and the difference voltage between the voltage of source 24 and the Zener voltage (in order to effect conduction in the Zener diode). This sum is equal to the Zener voltage of Zener diode 9, so that when the total voltage between lines 2, 3 is equal to the Zener voltage, the branch 21, 9 conducts and the voltage limitation becomes effective. With this polarity of the voltage peak the branch 8, 20 is blocked due to the pass direction of the diode 20.

Conversely, with a negative voltage having an amplitude which exceeds the Zener voltage at the line 2 with respect to line 3 the branch 9, 21 is blocked and the branch 20, 8 is conductive. The voltage peak is thus again limited to the Zener voltage.

By its function as an overvoltage protection circuit the arrangement shown provides an effective protection of the apparatus and at the same time a disturbing influence of the quality of transmission due to the Zener diode capacities 18, 19 is greatly reduced.

In this circuit the Zener diode capacities 18, 19, varying with the signal voltage and having a value of 500 μμf., are connected via the much smaller capacity 26, 27 of the series diodes 20, 21, of, for example, 1 μμf., between the lines 2, 3 so that the total capacity between the lines 2, 3 is reduced to the value of the considerably smaller series diode capacities 26, 27. These capacities are so low that signal distortion due to variable capacities is eliminated. The influence on the signal by the Zener diode capacities 18, 19 via the series resistors 22, 23, connecting these capacities 18, 19 by way of the bias voltage source 24 to the central tapping 25 of the primary winding of the input transformer 4, is immaterial, since the resistance of these series resistors 22, 23 is considerably greater than the impedance of the Zener diode capacities 18, 19 at the higher signal freqeuncies for example, by a factor 50. In the embodiment shown these series resistors 22, 23 have a value of 30K ohm. Thus the measure according to the invention provides an effective decoupling of the disturbing Zener diode capacities 18, 19 in the signal path formed by the lines 2, 3.

Apart from an effective protection of the apparatus, the device according to the invention provides a reduction of the influence on the quality of the transmitted signals due to the Zener diode capacities 18, 19 to a very small fraction as compared with this influence in the device shown in FIG. 1 Measurements carried out with the device according to the invention proved that with the measuring signal referred to above of 387 mv. and a frequency of 180 kc./s. the second and third harmonics due to distortion of this measuring signal voltage could no longer be assessed. The distortion products, having in the known device shown in FIG. 1 a intensity of −68 db and −84 db, respectively, are reduced in the device according to the invention to intensities of less than −110 db.

The values of components of a circuit of the kind set forth which was tested in practice, referred to partly in the foregoing disclosure, are as follows:

Zener diodes 8, 9: OAZ207
Series resistors 22, 23: 30 K ohms
Series diodes 20, 21: OA5
Blocking voltage: 5 v.

What is claimed is:

1. An over voltage protection circuit for use in a transmission apparatus to protect the apparatus from high peak voltages, said circuit comprising two Zener diodes operating as voltage limiters and connected with relatively different pass directions, characterized in that the Zener diodes are included in separate parallel connected branches, each branch including a conventional diode in series with each of these Zener diodes, the pass direction of each conventional diode corresponding with the Zener pass direction of the respective series-connected Zener diode, the junction of the Zener diodes and the series-connected conventional diodes in each of said parallel connected branches being connected by way of a series resistor to a bias voltage source, said bias voltage source being connected to supply a blocking voltage for the conventional diodes.

2. A circuit as claimed in claim 1, characterized in that the blocking voltage of the conventional diodes is approximately equal to half the Zener voltage.

3. An overvoltage protection circuit for limiting the maximum voltage between first and second conductors, said circuit comprising first and second series circuits each connected between said first and second conductors, each of said series circuits comprising a series-connected conventional diode and Zener diode, with the pass direction of the conventional diode being the same as the Zener pass direction of the Zener diode in each series circuit and the Zener pass direction of the Zener diodes of the first and second series circuits being opposite with respect to said conductors, bias voltage source means, first and second resistor means each having one end connected to a separate junction between said conventional diodes and Zener diodes, and means connecting said source means to the other ends of said resistor means to provide a blocking bias for said conventional diodes.

4. An overvoltage protection circuit for limiting the maximum voltage between first and second conductors of a transmission line of the type wherein one end of said line is connected to a signal source and the other end thereof is connected to the primary winding of an input transformer, said circuit comprising a first conventional diode and first Zener diode connected serially in that order between said first and second conductors, a second Zener diode and second conventional diode connected serially in that order between said first and second conductors, the pass direction of each conventional diode being the same as the Zener pass direction of the respective Zener diode, the Zener pass directions of said Zener diodes being opposite with respect to said conductors, a tap on said primary winding, a source of bias voltage having one end connected to said tap, and a separate resistor connected between each junction of a conventional diode and Zener diode and the other end of said bias voltage source, said bias voltage source having a polarity for blocking said conventional diodes.

No references cited.

SAMUEL BERNSTEIN, *Primary Examiner.*